United States Patent
Miyamoto

[19]

[11] Patent Number: 5,771,219
[45] Date of Patent: Jun. 23, 1998

[54] OPTICAL INFORMATION RECORDING AND/OR REPRODUCING APPARATUS

[75] Inventor: Moritoshi Miyamoto, Kawasaki, Japan

[73] Assignee: Canon Kabushiki Kaisha, Tokyo, Japan

[21] Appl. No.: 873,724

[22] Filed: Jun. 12, 1997

Related U.S. Application Data

[63] Continuation of Ser. No. 239,260, Apr. 20, 1994, abandoned.

[30]    Foreign Application Priority Data

Apr. 23, 1993  [JP]  Japan  .................................... 5-119291
Dec. 14, 1993  [JP]  Japan  .................................... 5-313237
Apr.  6, 1994  [JP]  Japan  .................................... 6-068261

[51] Int. Cl.$^6$ ..................................................... G11B 7/00
[52] U.S. Cl. ........................... 369/112; 369/109; 369/110
[58] Field of Search .................................. 369/109, 110, 369/112, 44.11, 44.12, 44.14, 44.37, 44.38

[56]                References Cited

U.S. PATENT DOCUMENTS

| | | | |
|---|---|---|---|
| 5,070,494 | 12/1991 | Emoto et al. | 369/112 |
| 5,101,389 | 3/1992 | Ohuchida et al. | 369/44.12 |
| 5,313,441 | 5/1994 | Imai et al. | 369/112 |

FOREIGN PATENT DOCUMENTS

| | | |
|---|---|---|
| 207164 | 1/1987 | European Pat. Off. . |
| 379285 | 7/1990 | European Pat. Off. . |
| 393885 | 10/1990 | European Pat. Off. . |
| 467303 | 1/1992 | European Pat. Off. . |
| 61-148630 | 7/1986 | Japan ................................... 369/112 |
| 5-109107 | 4/1993 | Japan ................................... 369/112 |
| 2169123 | 7/1986 | United Kingdom . |

*Primary Examiner*—Paul W. Huber
*Attorney, Agent, or Firm*—Fitzpatrick, Cella, Harper & Scinto

[57]                ABSTRACT

An optical information recording and/or reproducing apparatus includes a stationary portion and a movable portion. The stationary portion has an irradiation optical system for emitting a beam for recording information in an optical information recording medium and/or reproducing recorded information, and a detection optical system for detecting a beam from the recording medium. The movable portion is movable relative to the stationary portion and has an objective lens. The movable portion has a first optical path for irradiating the beam from the irradiation optical system onto the recording medium and a second optical path for guiding the beam from the recording medium to the detection optical system. The first optical path and the second optical path are formed as partly different paths. A beam separator for separating the beam from the irradiation optical system into a plurality of beams is set in the specific path only for the first optical system.

8 Claims, 15 Drawing Sheets

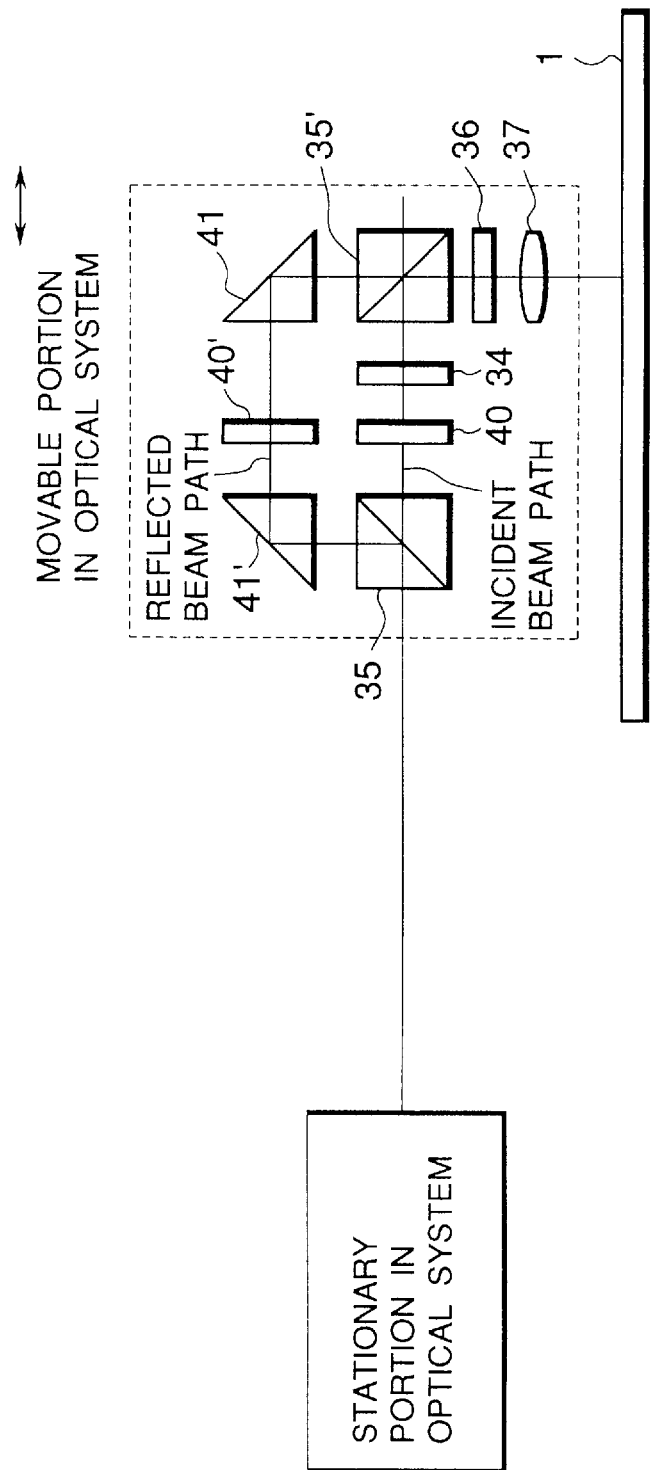

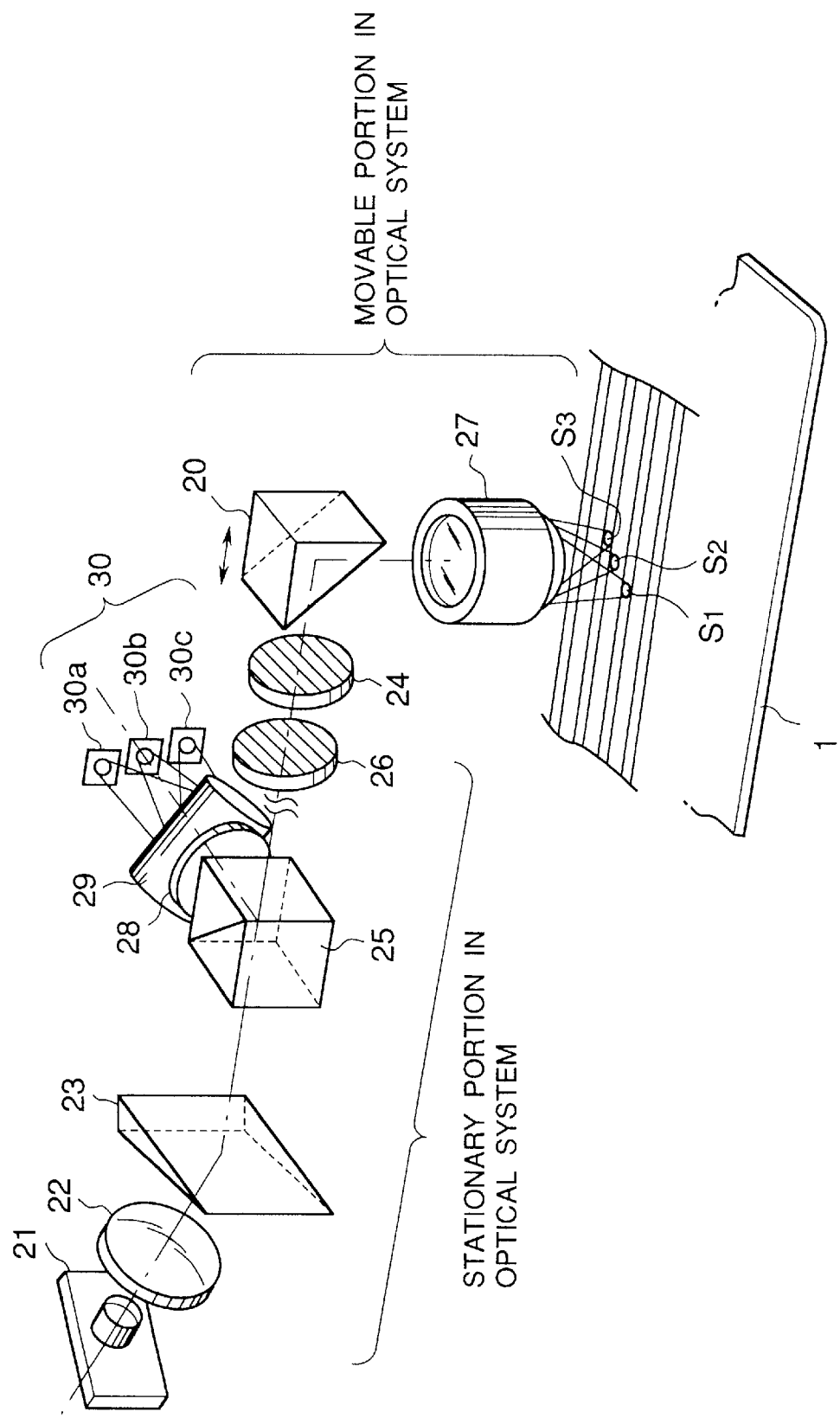

OPTICAL INFORMATION RECORDING AND/OR REPRODUCING APPARATUS

This application is a continuation of application Ser. No. 08/230,260, filed Apr. 20, 1994, now abandoned.

BACKGROUND OF THE INVENTION

1. Field of the Invention

The present invention relates to an optical information recording and/or reproducing apparatus for recording information in an optical information recording medium, reproducing the information recorded in the recording medium, and/or erasing the information recorded in the recording medium. More particularly, the present invention relates to an optical information recording and/or reproducing apparatus with an optical system in which an optical head comprises a stationary portion and a movable portion.

2. Related Background Art

There are conventionally known various types of information recording media for recording or reproducing information with light, for example a disc type, a card type, a tape type, etc. These optical information recording media include those for recording and reproduction and those only for reproduction. Information is recorded in a recordable medium while scanning an information track with an optical beam as modulated according to recorded information and as focused in a fine spot. Thus, the information is recorded as information bit strings which can be optically detected.

Also, information is reproduced from a recording medium by scanning information bit strings in an information track with an optical beam spot of a constant power low enough to avoid recording in the medium and then detecting reflected light or transmitted light from the medium.

An optical head used in recording the information in the above-described recording medium or in reproducing the information therefrom is arranged as relatively movable relative to the recording medium in the information track direction and in the transverse direction across the information track direction, and movement of the optical head effects the scanning of information track with the optical beam spot. For example, an objective lens is used as a focusing lens for the optical beam spot in the optical head. The objective lens is held in the optical head body such that it can move independently in the direction of the optical axis thereof (in the focusing direction) and in the direction perpendicular to both the optical axis direction and the information track direction of recording medium (in the tracking direction). Such holding of the objective lens is generally effected through an elastic member, and the movement of the objective lens in the above two directions is generally achieved by actuators utilizing magnetic interaction.

Meanwhile, a great future demand is expected for an optical information recording medium in the form of a card (hereinafter referred to as an optical card) among the above-described optical information recording media since it is a compact, lightweight and portable information recording medium with a relatively large capacity.

FIG. 1 is a diagrammatic plan view of a direct read after write optical card, and FIG. 2 is a partially enlarged view thereof.

In FIG. 1, many information tracks 2 are arranged in parallel in L-F directions on an information recording surface of optical card 1. Also, a home position 3 is provided as a reference position for access to the information tracks 2 on the information recording surface of optical card 1. The information tracks 2 are arranged in the order of 2-1, 2-2, 2-3, . . . from the side of home position 3. Further, tracking tracks 4 are arranged adjacent to the information tracks in the order of 4-1, 4-2, 4-3, . . . , as shown in FIG. 2. These tracking tracks 4 are used as a guide for autotracking (hereinafter referred to as AT) in which the beam spot is controlled not to depart from a desired information track during scanning by the optical beam spot in recording or reproducing information.

The AT servo is effected as follows. The optical head detects a deviation (AT error) of the optical beam spot from a desired information track. The thus detected signal is negatively fed back to the tracking actuator, so that the objective lens is moved relative to the optical head body in the tracking direction (in the D direction) so as to make the optical beam spot follow the desired information track.

Also, autofocusing (hereinafter referred to as AF) servo is effected in order to make an optical beam form a suitable size spot (or focused) on the optical card surface while the information track is scanned by the optical beam spot in recording or reproducing information. The AF servo is carried out such that the optical head detects a deviation (AF error) of the optical beam spot from a focused state and the thus detected signal is negatively fed back to the focusing actuator to move the objective lens relative to the optical head body in the focusing direction so as to make the optical beam spot focused on the optical card surface.

In FIG. 2, $S_1$, $S_2$ and $S_3$ represent optical beam spots. The optical spots $S_1$ and $S_3$ are used for AT, while the optical spot $S_2$ for AF, producing information bits in recording, and reading information bits in reproduction. In the information tracks, 6-1, 6-2 and 7-1, 7-2 represent left address portions and right address portions, respectively, and are pre-formatted. An information track is discriminated by reading its address portion. Numeral 5 (5-1, 5-2 in the drawing) denotes data portions, in which predetermined information is to be recorded.

Here, an optical information recording method is described using the schematic drawing of an optical system of optical head as shown in FIG. 3.

In FIG. 3, reference numeral 21 designates a semiconductor laser as a light source, which emits light of a wavelength of 830 nm as polarized in a direction perpendicular to the tracks in this example. Also, numeral 22 denotes a collimator lens, 23 denotes a beam shaping prism, 24 denotes a diffraction grating for splitting a beam, and 25 denotes a polarization beam splitter. Further, numeral 26 is a quarter wave plate, 20 denotes a mirror, 27 denotes an objective lens, 28 denotes a spherical lens, 29 denotes a cylindrical lens, and 30 denotes a photodetector. The photodetector 30 is composed of two light receiving elements 30a, 30c and a light receiving element 30b divided into quarters.

An optical beam emitted from the semiconductor laser 21 is incident as a divergent bundle of rays into the collimator lens 22. The collimator lens collimates the divergent beam into an optical beam of parallel rays, and the parallel beam is shaped by the beam shaping prism 23 into a beam with a predetermined light intensity distribution, i.e., with a circular intensity distribution. Then the shaped beam enters the diffraction grating 24, which splits the beam into three effective optical beams (a zeroth order diffraction beam and ±first order diffraction beams). The three beams are incident as p-polarized beams into the polarization beam splitter 25. The polarization beam splitter 25 has spectral characteristics as shown in FIG. 4, so that it transmits almost 100% of incident p-polarized light.

Then the three beams are allowed to pass through the quarter wave plate 26 to be converted into circularly polarized beams, which are focused on the optical card 1 by the objective lens 27. The thus focused beams are three fine beam spots $S_1$ (+first order diffraction beam), $S_2$ (zeroth order diffraction beam) and $S_3$ (-first order diffraction beam) as shown in FIG. 3. The beam spot $S_2$ is used for recording, reproduction and AF control, while the beam spots $S_1$ and $S_3$ for AT control. Positions of the spots on the optical card 1 are, as shown in FIG. 2, such that the optical beam spots $S_1$, $S_3$ are located on adjacent tracking tracks 4 and the optical beam spot $S_2$ on an information track 2 between the tracking tracks. Then reflected light from the optical beam spots formed on the optical card 1 is let to pass again through the objective lens 27 to become parallel beams. Again passing through the quarter wave plate 26, the beams are converted into optical beams with their polarization direction rotated 90° with respect to that upon incidence. Thus, the beams are incident as s-polarized beams into the polarization beam splitter 25, which reflects almost 100% of the beams because of the spectral characteristics as shown in FIG. 4. The reflected beams are guided to a detection optical system.

The detection optical system includes a combination of a spherical lens 28 and a cylindrical lens 29, which conducts the AF control by the astigmatic method. The three reflected beams from the optical card 1 are focused by the detection optical system to enter the photodetector 30 and then to form three optical spots thereon. The light receiving elements 30a, 30c receive reflected beams of the above-described optical spots $S_1$, $S_3$, and the AT control is conducted using a difference between outputs from the two light receiving elements. On the other hand, the quarterly divided light receiving element 30b receives a reflected beam of the optical spot $S_2$, and the AF control is conducted and the recorded information is reproduced, using its output. FIG. 5 shows a state of the formation of optical spots on the light receiving elements 30a, 30b, 30c. The thus formed optical spots $S_a$, $S_b$, $S_c$ are completely included in the light receiving elements 30a, 30b, 30c.

Moving the entire optical system of the optical head as described above in the directions shown by the arrows, the optical beam spot $S_b$ can scan an information track.

The optical system of the optical head as described above may be separated into a fixed portion and a movable portion as shown in FIG. 3. As a result, by moving only the movable portion in the directions shown by the arrows, the optical beam spot $S_b$ can also scan an information track. Such a separate optical head requires the movable portion to move an amount equivalent to about the longitudinal length of optical card 1, normally about 100 mm.

In case of the above separate optical head, an optical path length, specifically one extending from the diffraction grating 24 through the movable portion, via the optical card 1 and again through the movable portion to the photodetector 30, changes depending upon the position of the movable portion. The change of the optical path length is approximately double the moving amount of the moving portion, which requires high accuracy for preventing a deviation of the optical axis of the optical system. This demands high accuracy in the components and high accuracy in assembling them, thus increasing the time and labor necessary for machining and assembling the components. Thus, a cost reduction cannot be possible.

With a great deviation of the optical axis, only one of the two AT control beams will have an eclipse as defined by the effective diameter of an optical element such as the objective lens 27, which would cause AT offset.

For example, suppose a diffraction angle of the diffraction grating 24 is 30', a distance between the diffraction grating 24 and the objective lens 27 is 100 mm, the effective diameter of objective lens 27 is 5 mm, and the diameter of each beam is 3 mm. Then a positional relation between the three beams on the objective lens is as shown in FIG. 6. The two AT control beams (±first order beams) are 0.2 mm close to the effective diameter of objective lens. If there is an inclination or a parallel shift of the optical axis, only one of the beams will have an eclipse due to the effective diameter of objective lens, which would be a cause of AT offset. In more detail, if the optical axis parallel shift exceeds 0.2 mm or if the optical axis inclination exceeds 8', in this case, AT offset will occur. FIGS. 7A and 7B show the states of formation of optical spots with beam eclipse. FIG. 7A shows a case in which only the power of spherical lens 28 has an effect, and FIG. 7B a case in which the power of spherical lens 28 and the power of cylindrical lens 29 have a maximum effect. Actually, there appears a state out of the states in FIGS. 7A and 7B and various intermediate states, causing an eclipse of optical spot $S_a$ or optical spot $S_c$ formed on the light receiving element in the photodetector as placed at the position of the least circle of confusion and in turn causing AT offset.

Further, in case of the above conventional separate head, the optical path length changes depending upon the position of the moving portion, the amount of AT offset also changes therewith, and the changes are too large to handle.

The effective diameter of each optical element in the optical system may be increased in order to prevent the occurrence of AT offset, but it is disadvantageous from the perspective of size reduction and weight reduction and hinders improvement in optical head moving speed, i.e., to an improvement in recording or reproducing rate. Also, the machining accuracy and the assembling accuracy of components may be enhanced in order to prevent the occurrence of AT offset, but it greatly increases the production cost.

SUMMARY OF THE INVENTION

In view of the above problems in the conventional technology, it is an object of the present invention to provide an optical information recording and/or reproducing apparatus which requires moderate accuracy for preventing the optical axis deviation of the optical system, which has a wide allowable range in machining and assembling of components and which provides a cost reduction.

In view of the above problems in the conventional technology, it is another object of the present invention to provide an optical information recording and/or reproducing apparatus which reduces the possibility of the occurrence of AT offset, and which, even if AT offset should occur, can control it in so small amount as to be easily handled.

The present invention provides an optical information recording and/or reproducing apparatus as achieving the above objects, which has an optical head for converging a beam from an irradiation optical system to irradiate it as an optical spot onto an optical information recording medium and projecting a beam from the optical spot on the recording medium onto a detection optical system, and which is for recording information in the recording medium by irradiation of the beam from the irradiation optical system and/or reproducing the recorded information.

The optical system of the optical head is composed of a stationary portion including the irradiation optical system and the detection optical system and a movable portion movable relative to the stationary portion and comprising an objective lens. The movable portion provides an incident beam path for spot-irradiating the beam from the irradiation optical system onto the recording medium and a reflected beam path for guiding the beam from the optical spot on the recording medium to the detection optical system. The incident beam path and the reflected beam path are formed as partly different paths, and beam separating means is arranged in the path only for the incident beam path.

According to one aspect of the present invention, the beam separating means is a diffraction grating.

According to one aspect of the present invention, a member in the movable portion into which the beam from the irradiation optical system is incident is a member in the movable portion from which the beam to the detection optical system is outgoing.

According to another aspect of the present invention, a polarization beam splitter for separating the incident beam path and the reflected beam path is arranged in the movable portion.

According to another aspect of the present invention, a half wave plate is set in the path only for the incident beam path in the movable portion and another half wave plate is set in the path only for the reflected beam path in the movable portion.

According to another aspect of the present invention, there are two sets of polarization beam splitters, quarter wave plate and reflecting means set in the movable portion. The sets deflect a polarized beam 90° with 90° rotation of its polarization direction, a polarization beam splitter for one of the two sets is a polarization beam splitter for separating the incident beam path and the reflected beam path, and the other beam splitter out of the two sets forms the path only for the incident beam path or the path only for the reflected beam path.

According to another aspect of the present invention, the polarization beam splitter, the quarter wave plate and the reflecting means constituting each set are incorporated with each other.

The present invention provides an optical information recording and/or reproducing apparatus as achieving the above objects, which has an optical head for converging a beam from an irradiation optical system to irradiate it as an optical spot onto an optical information recording medium and for projecting a beam from the optical spot on the recording medium onto a detection optical system, and which is for recording information in the recording medium by irradiation of the beam from the irradiation optical system and/or reproducing the recorded information.

The optical system of the optical head is composed of a stationary portion including the irradiation optical system and the detection optical system and a movable portion movable relative to the stationary portion and comprising an objective lens, and a diffraction grating set in the moving portion.

The present invention provides an optical information recording and/or reproducing apparatus as achieving the above objects, which has an optical head for converging a beam from an irradiation optical system to irradiate it as an optical spot onto an optical information recording medium and projecting a beam from the optical spot on the recording medium onto a detection optical system, and which is for recording information in the recording medium by irradiation of the beam from the irradiation optical system and/or reproducing the recorded information.

The optical system of the optical head is composed of a stationary portion including the irradiation optical system and the detection optical system and a movable portion movable relative to the stationary portion and comprising an objective lens. The beam from the irradiation optical system is allowed to pass through an incident beam path and then is spot-irradiated onto the recording medium through the movable portion. A beam from the optical spot on the recording medium is allowed to pass through the movable portion and then through a reflected beam path to be projected onto the detection optical system, and the incident beam path and the reflected beam path are located on opposite sides to each other with respect to the moving portion.

According to one aspect of the invention, a diffraction grating is set in the incident beam path in the movable portion.

According to another aspect of the invention, the movable portion comprises light reflecting means, which is arranged to reflect a beam from the incident beam path so as to let the beam travel in parallel with the optical axis of the objective lens and then enter the objective lens.

According to still another aspect of the invention, the movable portion comprises light reflecting means, which is arranged to reflect a beam from the incident beam path so as to let the beam travel in the direction perpendicular to the recording medium and then impinge on the recording medium.

According to still another aspect of the invention, the movable portion comprises light reflecting means being a triangular prism.

According to still another aspect of the invention, the movable portion comprises light reflecting means being a triangular prism, an apex of which is located on the optical axis of the objective lens. A beam coming from the incident beam path is reflected by a first reflecting surface of the triangular prism to travel toward the objective lens, and a beam from the optical spot on the recording medium and through the objective lens is reflected by a second reflecting surface of the triangular prism to travel toward the reflected beam path.

According to still another aspect of the invention, the incident beam path and the reflected beam path are arranged on a straight line.

According to still another aspect of the invention, the movable portion comprises optical path separating means, and the optical path separating means comprises a polarization beam splitter, a quarter wave plate and reflecting means. Here, a diffraction grating may be set in the incident beam path in the movable portion, and the diffraction grating and the polarization beam splitter, the quarter wave plate and the reflecting means in the optical path separating means may be bonded to each other to be incorporated therewith.

The present invention provides an optical information recording and/or reproducing apparatus as achieving the above objects, which has an optical head for converging a beam from an irradiation optical system to irradiate it as an optical spot onto an optical information recording medium and for projecting a beam from the optical spot on the recording medium onto a detection optical system, and which is for recording information in the recording medium by irradiation of the beam from the irradiation optical system and/or reproducing the recorded information.

A beam from the irradiation optical system is let to pass through an incident beam path and then is spot-irradiated onto the recording medium through optical path separating means. A beam from the optical spot on the recording medium is allowed to pass through the optical path separating means and then through a reflected beam path to be projected onto the detection optical system, and the irradiation optical system and the detection optical system are so arranged that the incident beam path and the reflected beam path are juxtaposed.

According to one aspect of the invention, the incident beam path and the reflected beam path are parallel to the recording medium.

According to another aspect of the invention, the incident beam path and the reflected beam path are perpendicular to the recording medium.

According to still another aspect of the invention, the optical path separating means comprises a polarization beam splitter, a quarter wave plate and reflecting means. Here, a diffraction grating may be set in the incident beam path in the optical path separating means, and the diffraction grating, the polarization beam splitter, the quarter wave plate and the reflecting means may be bonded to each other to be incorporated therewith.

The present invention provides an optical information recording and/or reproducing apparatus as achieving the above objects, which has an optical head for converging a beam from an irradiation optical system to irradiate it as an optical spot onto an optical information recording medium and for projecting a beam from the optical spot on the recording medium onto a detection optical system, and which is for recording information in the recording medium by irradiation of the beam from the irradiation optical system and/or reproducing the recorded information.

An optical system of the optical head is composed of a stationary portion including the irradiation optical system and the detection optical system and a movable portion movable relative to the stationary portion and comprising an objective lens. The beam from the irradiation optical system is allowed to pass through an incident beam path and then is spot-irradiated onto the recording medium through the movable portion. A beam from the optical spot on the recording medium is allowed to pass through the movable portion and then through a reflected beam path to be projected onto the detection optical system, and the incident beam path and the reflected beam path are separately formed without any common portion.

According to another aspect of the invention, the incident beam path and the reflected beam path are located on a same side with respect to the movable portion.

According to another aspect of the invention, a diffraction grating is set in the incident beam path in the movable portion.

According to still another aspect of the invention, the movable portion comprises light reflecting means, which reflects a beam from the incident beam path so as to let the beam travel in parallel with the optical axis of the objective lens and then enter the objective lens.

According to still anther aspect of the invention, the movable portion comprises light reflecting means, which reflects a beam from the incident beam path so as to let the beam travel in a direction perpendicular to the recording medium and then impinge on the recording medium.

According to still anther aspect of the invention, the incident beam path and the reflected beam path are parallel to each other.

According to still another aspect of the invention, the incident beam path and the reflected beam path are parallel to the recording medium.

According to still another aspect of the invention, the movable portion comprises optical path separating means, and the optical path separating means comprises a polarization beam splitter, a quarter wave plate and reflecting means. Here, a diffraction grating may be set in the incident beam path in the movable portion, and the diffraction grating, and the polarization beam splitter, the quarter wave plate and the reflecting means in the optical path separating means may be bonded to each other to be incorporated therewith.

BRIEF DESCRIPTION OF THE DRAWINGS

FIG. 8 is a schematic structural drawing to show an example of an optical head in an optical information recording and/or reproducing apparatus according to the present invention;

FIG. 10 is a schematic structural drawing to show an example of an optical head in an optical information recording and/or reproducing apparatus according to the present invention;

DETAILED DESCRIPTION OF THE PREFERRED EMBODIMENTS

Figure 1:
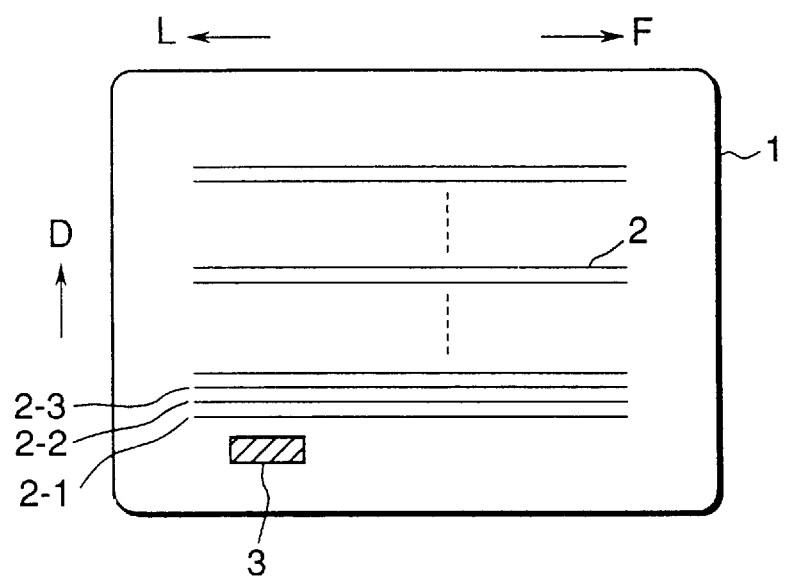
FIG. 1 is a diagrammatic plan view of an optical card.

Embodiments of the present invention will be described in detail with reference to the accompanying drawings.

FIG. 8 is a schematic structural drawing to show an example of an optical head in an optical information recording and/or reproducing apparatus according to the present invention.

In FIG. 8, reference numeral 1 designates an optical card. A stationary portion in an optical system of an optical head has a structure similar to that as described referring to FIG. 3. Specifically, though not shown in FIG. 8, the stationary portion in the optical system in the present embodiment comprises a semiconductor laser 21, a collimator lens 22, a beam shaping prism 23, a polarization beam splitter 25, a spherical lens 28, a cylindrical lens 29 and a photodetector 30 as described above referring to FIG. 3. The photodetector 30 is composed of two light receiving elements 30a, 30c and a quarterly divided light receiving element 30b. However, the stationary portion in the optical system in the present embodiment excludes the diffraction grating 24 and the quarter wave plate 26 as described above referring to FIG. 3.

On the other hand, a movable portion in the optical system in the present embodiment has two polarization beam splitters 35, 35', a quarter wave plate 36, an objective lens 37, two half wave plates 40, 40' and two total reflection prisms 41, 41', and can move in the directions of the arrows.

A beam of parallel rays emitted from the stationary portion travels straight approximately in parallel with the surface of optical card 1 and then enters the polarization beam splitter 35 in the movable portion. The beam of parallel rays emitted from the stationary portion is polarized in the direction of the plane of the drawing, and thus is incident as a p-polarized beam into the polarization beam splitter 35, which transmits the p-polarized beam. The half wave plate 40 rotates the direction of polarization of the thus transmitted beam by 90° in a direction perpendicular to the plane of the drawing. The diffraction grating 34 splits the beam into three beams (zeroth order diffraction beam, +first order diffraction beam and –first order diffraction beam), which are incident as s-polarized beams into the polarization beam splitter 35' and are reflected thereby. The beams pass through the quarter wave plate 36 and are then focused by the objective lens 37 to form optical spots on the optical card 1. Beams from the optical spots are allowed to pass through the objective lens 37 and the quarter wave plate 36 and again enter the polarization beam splitter 35'. Since the beams pass through the quarter wave plate 36 twice before this incidence, the beams are incident as p-polarized beams into the polarization beam splitter 35', which transmits the p-polarized beams. After that, the beams are reflected by the total reflection prism 41. The half wave plate 40' rotates the direction of polarization of the beams by 90° and the total reflection prism 41' further reflects the beams. Then the beams are incident as s-polarized beams into the polarization beam splitter 35. The beams are reflected by the beam splitter 35 and then travel toward the stationary portion. The traveling path of the beams from the polarization beam splitter 35 to the stationary portion is the same as (but opposite to) the traveling path of the beam traveling from the stationary portion into the polarization beam splitter 35 in the movable portion. The beams reaching the stationary portion from the movable portion are then detected in the same manner as in the conventional apparatus.

In the above movable portion, an incident beam path is a path extending from the polarization beam splitter 35 through the half wave plate 40, the diffraction grating 34, the polarization beam splitter 35', the quarter wave plate 36 and the objective lens 37 to the optical card 1, while a reflected beam path is a path extending from the optical card 1 through the objective lens 37, the quarter wave plate 36, the polarization beam splitter 35', the total reflection prism 41, the half wave plate 40' and the total reflection prism 41' to the polarization beam splitter 35. The incident beam path and the reflected beam path have partly different paths, and the diffraction grating 34 is set in the path only for the incident beam path.

Figure 6:
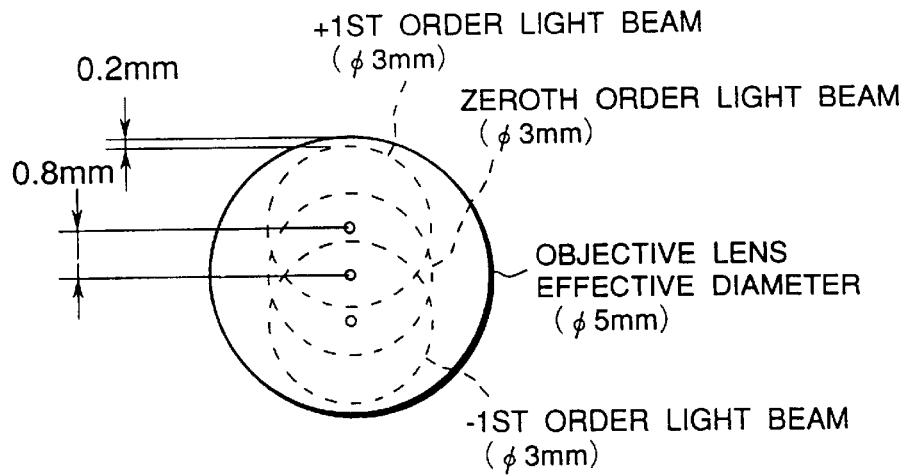
FIG. 6 is a drawing to show a positional relation of three beams on an objective lens in an optical head in an optical information recording and/or reproducing apparatus.
Figure 7A:
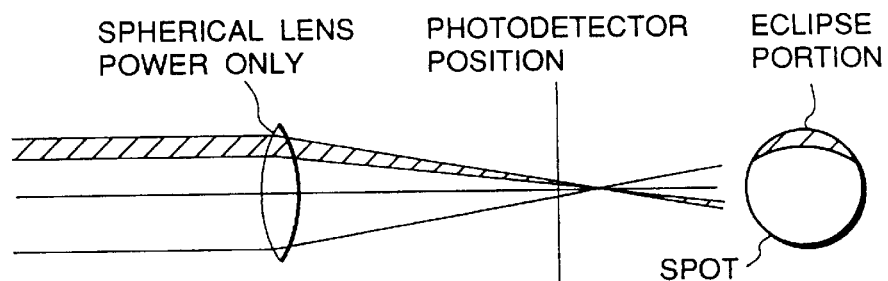
FIG. 7A and FIG. 7B are drawings each to show a state of formation of an optical spot with a beam eclipse.
Figure 7B:
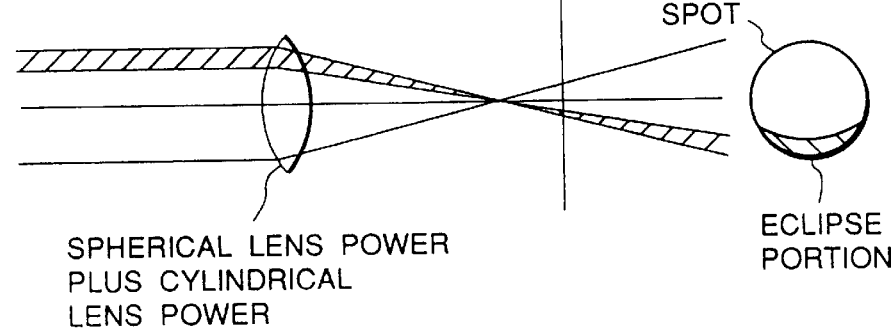

The present embodiment as described above may enjoy the following advantages. As described previously with FIG. 6, FIGS. 7A and 7B, the conventional apparatus has a distance of 1.6 mm between the center of +first order beam spot and the center of –first order beam spot on the optical card 1. When these beams return to the stationary portion, the distance between the beam centers becomes about doubled, i.e., 3.2 mm. In the conventional apparatus, the size of optical elements must be increased in order to avoid occurrence of beam eclipse. In contrast, since the above embodiment of the present invention is so arranged that the diffraction grating for beam separation is set in the movable portion, the distance between the centers of ±first order beams returning to the stationary portion is about a half of that of the above conventional apparatus. Thus, a deviation of the optical axis is less, and further the beam eclipse can be effectively prevented without the need to greatly increase the size (diameter) of optical elements. Also, since in the movable portion the diffraction grating is set in the path in the incident beam path not overlapping with the reflected beam path, a loss in quantity of light or production of unwanted light, which could be caused if a beam should be allowed to pass through the diffraction grating in the forward and return paths, can be avoided.

In the above embodiment, a reflecting member such as a mirror may replace each of the total reflection prisms in the movable portion.

Figure 9:
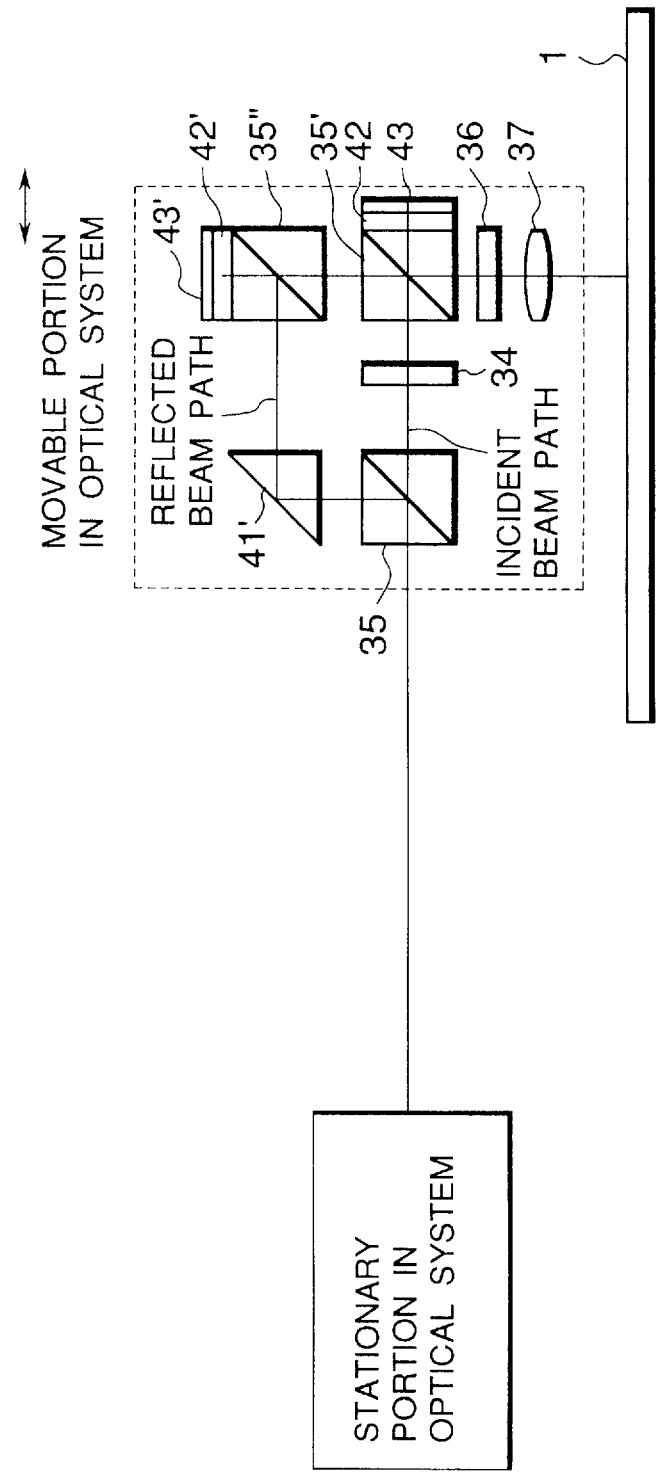
FIG. 9 is a schematic structural drawing to show another example of an optical head in an optical information recording and/or reproducing apparatus according to the present invention.

FIG. 9 is a schematic structural drawing to show another example of optical head in an optical information recording and/or reproducing apparatus according to the present invention. In FIG. 9, the same members as those in FIG. 8 are denoted by the same reference numerals.

The present embodiment employs a set of polarization beam splitter 35', quarter wave plate 42 and reflecting member 43, and another set of polarization beam splitter 35", quarter wave plate 42' and reflecting member 43', having the same structure.

A beam of parallel rays emitted from the stationary portion travels straight approximately in parallel with the surface of optical card 1 and then enters the polarization beam splitter 35 in the movable portion. The beam of parallel rays emitted from the stationary portion is polarized in the direction of the plane of the drawing and is incident as a p-polarized beam into the polarization beam splitter 35, which transmits the p-polarized beam. The diffraction grating 34 splits the transmitted beam into three beams (zeroth order diffraction beam, +first order diffraction beam and –first order diffraction beam). The three beams are incident as p-polarized beams into the polarization beam splitter 35', which transmits the p-polarized beams. The three beams are reflected with 90° rotation of their polarization plane by the quarter wave plate 42 and the reflecting member 43. Then the beams, are incident as s-polarized beams in return, into the polarization beam splitter 35', which reflects the s-polarized beams. The reflected beams are allowed to pass through the quarter wave plate 36 and then are focused by the objective lens 37 to form optical spots on the optical card 1. Beams from the optical spots are allowed to pass through the objective lens 37 and the quarter wave plate 36 and again enter the polarization beam splitter 35'. Since the beams pass through the quarter wave plate 36 twice before this incidence, the beams are incident as p-polarized beams into the polarization beam splitter 35', which transmits the p-polarized beams. After that, the beams are incident as p-polarized beams into the polarization beam splitter 35", which transmits the p-polarized beams. The beams are then reflected with 90° rotation of their polarization plane by the quarter wave plate 42' and the reflecting member 43'. Then the beams are incident as s-polarized beams in return into the polarization beam splitter 35", which reflects the s-polarized beams. The beams are further reflected by the total reflection prism 41' and then are incident as s-polarized beams into the polarization beam splitter 35, which reflects the beams. The reflected beams travel toward the stationary portion. The traveling path of the beams from the polarization beam splitter 35 to the stationary portion is the same as (but opposite to) the traveling path of the beam incident from the stationary portion into the polarization beam splitter 35 in the movable portion.

In the above movable portion, an incident beam path is a path extending from the polarization beam splitter 35, through the diffraction grating 34, the polarization beam splitter 35', the quarter wave plate 42, the reflecting member 43, the quarter wave plate 36 and the objective lens 37 to the optical card 1, while a reflected beam path is a path extending from the optical card 1, through the objective lens 37, the quarter wave plate 36, the polarization beam splitter 35', the polarization beam splitter 35", the quarter wave plate 42', the reflecting member 43' and the total reflection prism 41' to the polarization beam splitter 35. The incident beam path and the reflected beam path are formed as partly different paths, and the diffraction grating 34 is arranged in the path only for the incident beam path.

The present embodiment also enjoys the same advantages as the embodiment as shown in FIG. 8.

In the above embodiment, the members in the sets of polarization beam splitter, quarter wave plate and reflecting member may be separately placed.

As described above, the optical information recording and/or reproducing apparatus of the present invention are so arranged that the optical system of optical head is composed of the stationary portion including the irradiation optical system and the detection optical system and the movable portion being movable relative to the stationary portion and including the objective lens 37, that the movable portion has the incident beam path for irradiating the beam from the irradiation optical system onto the optical card 1 to form beam spots thereon and the reflected beam path for guiding the beams from the beam spots on the optical card 1 to the detection optical system, that the incident beam path and the reflected beam path are formed as partly different paths, and that the diffraction grating 34 for beam separation is set in the path only for the incident beam path. Numerals 35, 35' are the polarization beam splitters for separating the incident beam path and the reflected beam path, 36 the quarter wave plate, 40, 40' the half wave plates, and 41, 41' the total reflection prisms.

As described above, the present invention provides an optical information recording and/or reproducing apparatus which requires moderate accuracy for preventing a deviation of the optical axis of the optical system, which has a wide allowable range in machining and assembling the components, and which renders it easy to reduce the cost thereof.

Also, the present invention provides an optical information recording and/or reproducing apparatus which rarely has beam eclipse and the occurrence of AT offset due to the beam eclipse and which, even if a beam eclipse appears, can keep it small enough to be readily handled.

Further, according to the present invention, the beam separating means is located in the path in the incident beam path not overlapping with the reflected beam path, which can avoid a loss in the quantity of light and the occurrence of unwanted light, which could be caused if a beam should be allowed to pass through the beam separating means in the forward and return paths.

Further embodiments of the present invention will be described in detail with reference to the drawings.

FIG. 10 is a schematic structural drawing to show an example of an optical head in an optical information recording and/or reproducing apparatus according to the present invention.

Figure 3:
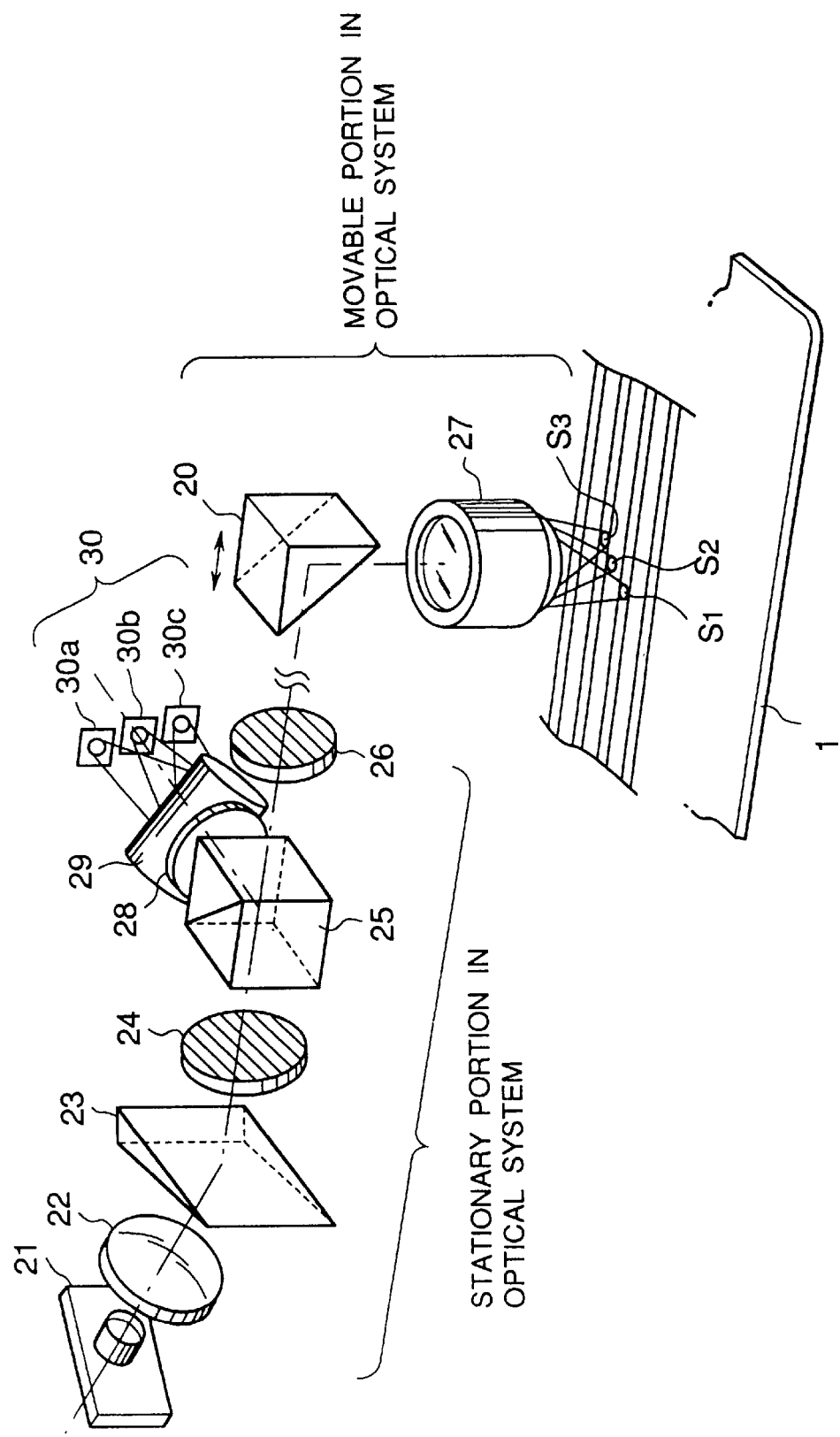
FIG. 3 is a drawing to show a separate optical system of optical head.

In FIG. 10, reference numeral 1 designates an optical card. In this drawing, the same members as those in FIG. 3 are denoted by the same reference numerals.

In FIG. 10, numeral 21 denotes a semiconductor laser as a light source, which emits light of wavelength of 830 nm as polarized in a direction perpendicular to tracks in this example. Also, numeral 22 denotes a collimator lens, 23 denotes a beam shaping prism, 24 denotes a diffraction grating for beam separation, and 25 denotes a polarization beam splitter. Further, numeral 26 denotes a quarter wave plate, 20 denotes a mirror, 27 denotes an objective lens, 28 denotes a spherical lens, 29 denotes a cylindrical lens, and 30 denotes a photodetector. The photodetector 30 is composed of two light receiving elements 30*a*, 30*c* and a light receiving element 30*b* divided into quarters.

Figure 4:
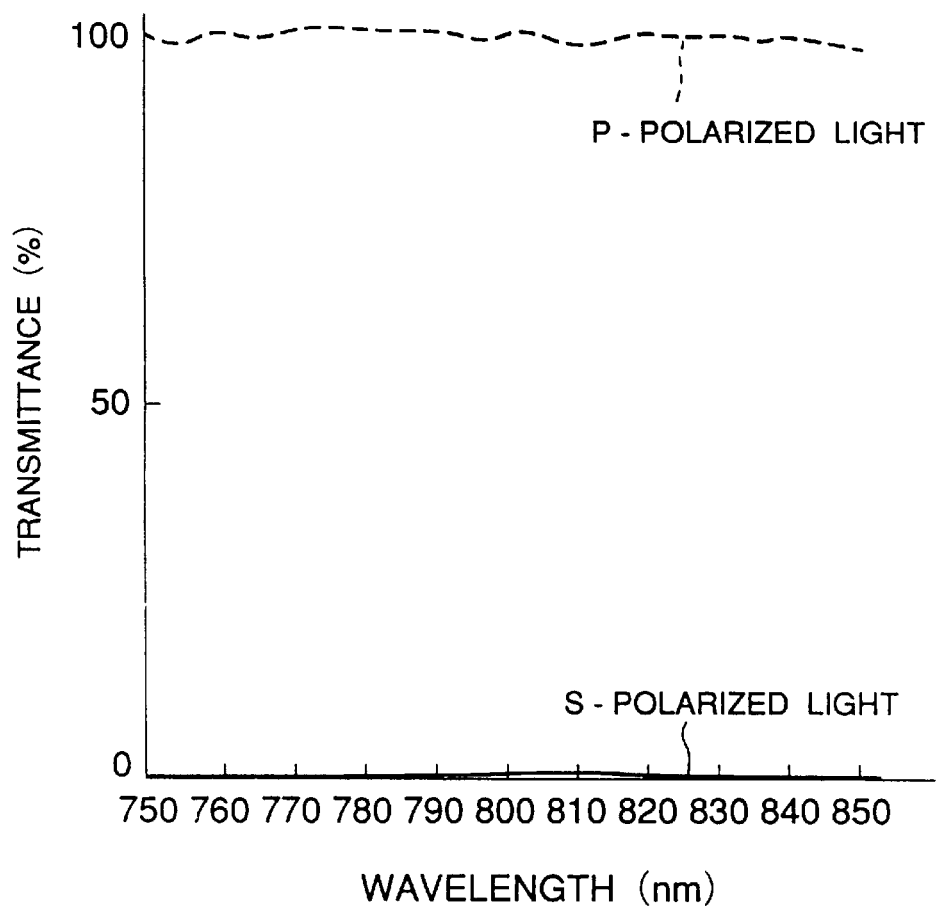
FIG. 4 is a drawing to show the spectral characteristics of a polarization beam splitter.

An optical beam emitted from the semiconductor laser 21 is incident in the form of a divergent bundle of rays into the collimator lens 22. The collimator lens collimates the optical beam into an optical beam of parallel rays. Further, the beam shaping prism 23 shapes the beam into a beam with a predetermined light intensity distribution, i.e., a beam with a circular intensity distribution. An irradiation optical system is constructed including the above semiconductor laser 21, collimator lens 22, beam shaping prism 23 and diffraction grating 24. Then the beam is incident as a p-polarized beam into the polarization beam splitter 25. The polarization beam splitter 25 has the spectral characteristics as shown in FIG. 4, so that it transmits almost 100% of incident p-polarized light. The beam next passes through the quarter wave plate 26 so as to be converted into a circularly polarized beam. Further, the beam enters the diffraction grating 24, which splits the beam into three effective optical beams (zeroth order diffraction beam and ±first order diffraction beams). These three beams are divergent at a fine angle θ as determined by a focal length f of objective lens 27 and a spot distance d on the optical card 1. The relation is d=f·tan θ.

Figure 2:
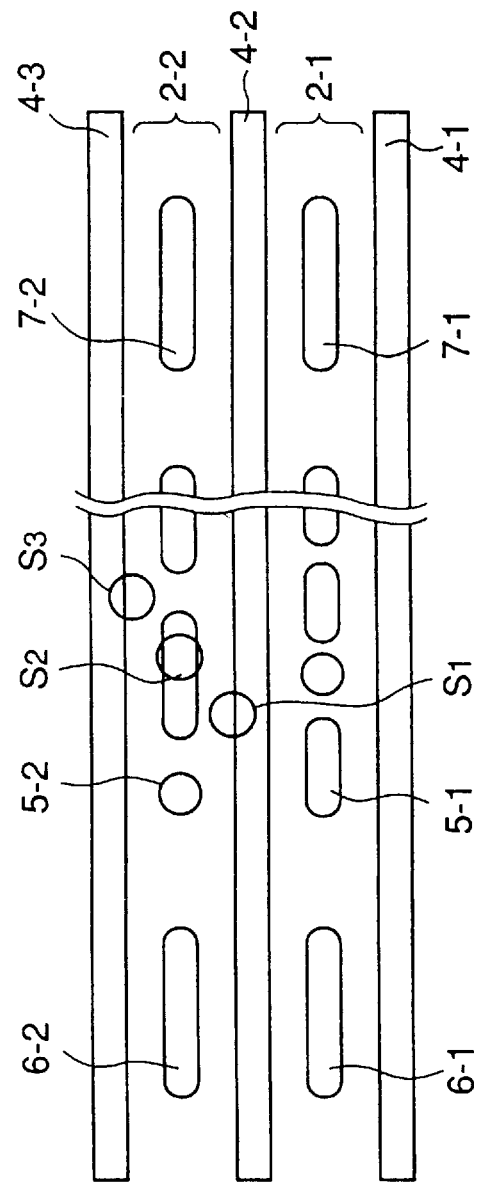
FIG. 2 is a partly enlarged drawing of the optical card.

Then the three beams traveling nearly in parallel with the surface of optical card 1 are reflected by the mirror 20 as reflecting means in the direction of the optical axis of objective lens 27, i.e., in a direction approximately along the direction perpendicular to the surface of optical card 1. Then the beams are focused on the optical card 1 by the objective lens 27. The thus focused light forms three fine beam spots $S_1$ (+first order diffraction beam), $S_2$ (zeroth order diffraction beam) and $S_3$ (-first order diffraction beam) as shown in FIG. 10. The spot $S_2$ is used for recording, reproduction and AF control, while the spots $S_1$ and $S_3$ for AT control. The positions of the spots on the optical card 1 are determined as shown in FIG. 2 such that the optical beam spots $S_1$, $S_3$ are located on adjacent tracking tracks 4 and the optical beam spot $S_2$ on an information track 2 between the tracking tracks.

Reflected light from the optical beam spots formed on the optical card 1 is allowed to pass again through the objective lens 27 to become parallel beams. The beams are reflected by the mirror 20 to pass through the diffraction grating 24. Further, the beams pass through the quarter wave plate 26, so that they are converted into optical beams, the direction of polarization of which is rotated 90° from that upon incidence. Thus, the beams are incident as s-polarized beams into the polarization beam splitter 25, which reflects almost 100% of the s-polarized beams because of the spectral characteristics as shown in FIG. 4. Then the beams are guided to the detection optical system. Since the beams guided to the detection optical system have passed twice through the diffraction grating 24, they include once-diffracted light and twice-diffracted light. However, as long as the AF control and AT control are correctly conducted, only slight noise can be detected, which provides no significant impact on the AF control and AT control.

Figure 5:
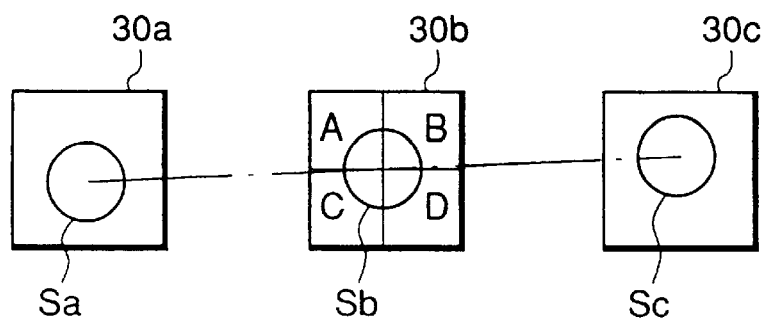
FIG. 5 is a drawing to show the relation between the shape and location of a photodetector and optical spots in an optical head in an optical information recording and/or reproducing apparatus.

The detection optical system includes a combination of a spherical lens 28 and a cylindrical lens 29, with which the AF control is performed by the astigmatic method. The three beams reflected from the optical card 1 are focused by the detection optical system to enter the photodetector 30, forming three optical spots thereon. The light receiving elements 30a, 30c receive reflected beams of the optical spots $S_1$, $S_3$. The AF control is performed using the difference between outputs from the two light receiving elements. Also, the quarterly divided light receiving element 30b receives a reflected beam of the optical spot $S_2$, and the AF control and reproduction of recorded information are carried out using an output therefrom. A state of formation of the optical spots on the light receiving elements 30a, 30b, 30c is shown in FIG. 5, in which the thus formed optical spots $S_a$, $S_b$, $S_c$ are completely included in the light receiving elements 30a, 30b, 30c.

The optical system of the optical head as described above is separated into the stationary portion and the movable portion, as shown in FIG. 10, and the movable portion includes the diffraction grating 24, the mirror 20 and the objective lens 27. Then the optical beam spot $S_2$ can scan an information track by moving only the movable portion in the directions shown by the arrows.

Setting the diffraction grating 24 in the movable portion as described can shorten the distance between the diffraction grating 24 and the objective lens 27 and can maintain the distance constant irrespective of movement of the movable portion, which can further suppress occurrence of optical axis deviation, and the occurrence of AT offset and a change thereof. This relaxes the acceptable range necessary for machining and assembling of the components of the device, which in turn facilitates a reduction in cost of the device.

A further advantage by mounting the diffraction grating 24 in the movable portion is a reduction in the occurrence of beam eclipse, so that the angle of diffraction by the diffraction grating can be made larger. This facilitates separation of three beams on the photodetector 30. Thus, satisfactory detection can be performed even if the detection optical system has a shorter focal length. Accordingly, the detection optical system portion can be made smaller, which in turn, permits the stationary portion in the optical system to be made smaller.

Figure 11A:
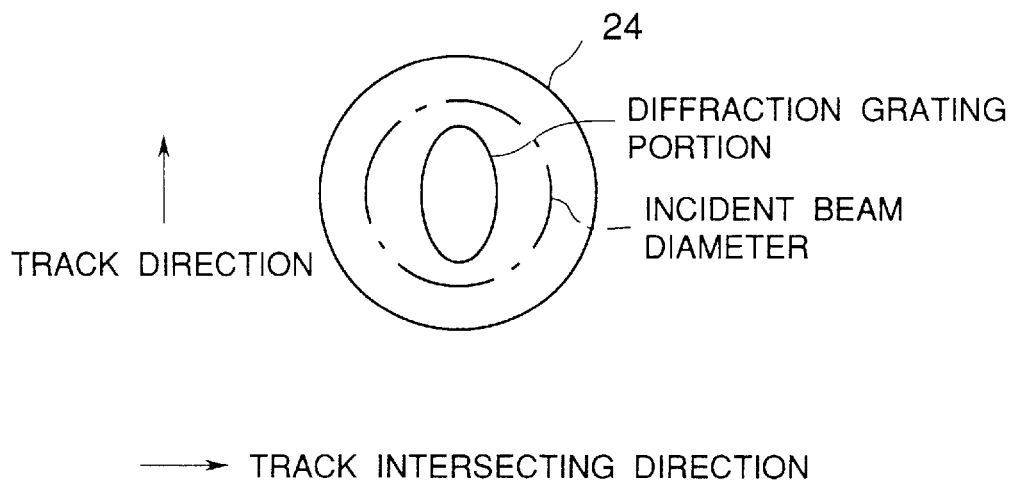
FIG. 11A and FIG. 11B are drawings to show an example of a diffraction grating used in an optical head in an optical information recording and/or reproducing apparatus according to the present invention and a state of spots on an optical card with the diffraction grating being used.
Figure 11B:
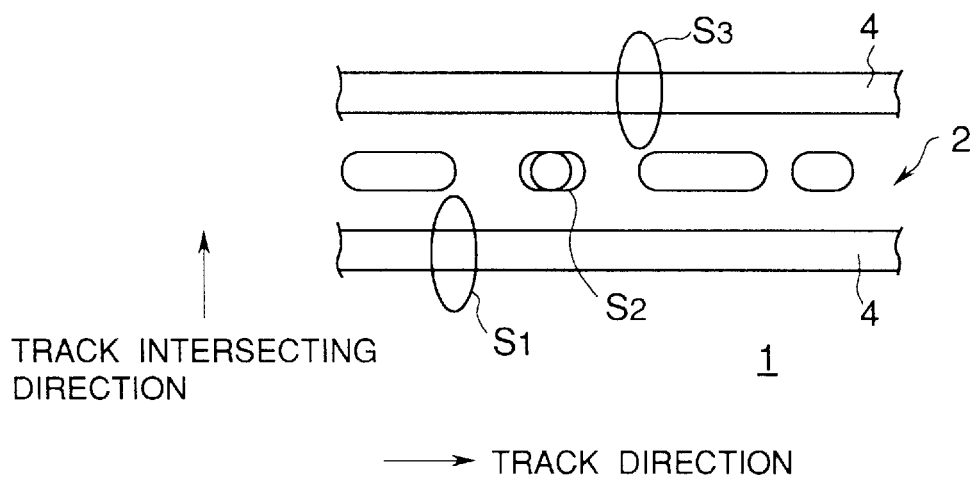

FIG. 11A shows an example of diffraction grating 24 in the embodiment of FIG. 10, and FIG. 11B is a drawing to show a state of spots on the optical card when the diffraction grating shown in FIG. 11A is used. Although the diffraction grating 24 may be an ordinary one with a diffraction effect on a total beam, it may be a diffraction grating 24, in which a diffraction grating portion is formed in an elliptic shape with a size in a direction corresponding to the track transverse direction being optically smaller than the size in a direction perpendicular thereto. With such a diffraction grating 24, and with the incidence of a beam having a larger diameter than the length in the major axis direction of the elliptic shape of the diffraction grating portion as shown in FIG. 11A, on the optical card 1, a circular small spot is formed as a zeroth order diffraction beam spot $S_2$ on the information track 2 while larger spots of an elliptic shape longer in the track transverse direction are formed as ±first order diffraction beam spots $S_1$, $S_2$ on the tracking tracks 4. This arrangement has such an advantage that the recording density can be improved by the reduction in size of optical spot $S_2$ and that the occurrence of AT offset becomes rare by increasing the size of optical spots $S_1$, $S_3$ especially in the track transverse direction.

Figure 12:
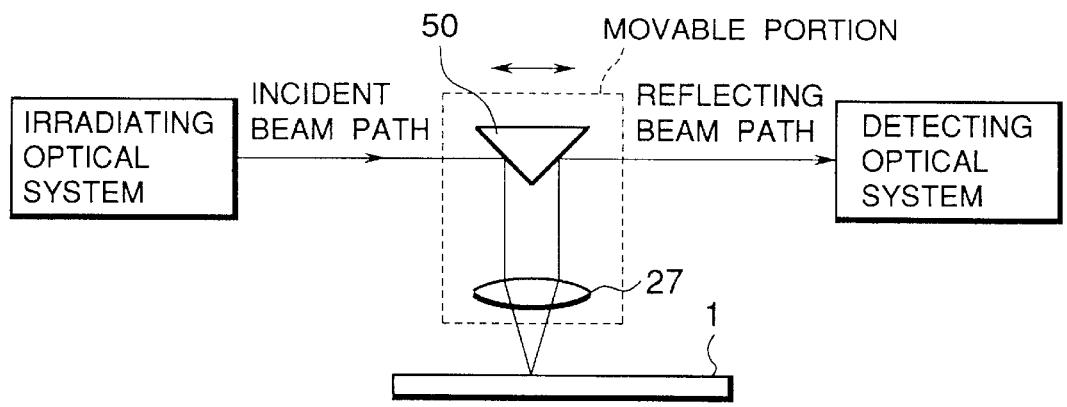
FIG. 12 is a schematic structural drawing to show an example of an optical head in an optical information recording and/or reproducing apparatus according to the present invention.

FIG. 12 is a schematic structural drawing to show an example of an optical head in an optical information recording and/or reproducing apparatus according to the present invention.

In FIG. 12, reference numeral 1 designates an optical card. An irradiation optical system includes a semiconductor laser, a collimator lens, a beam shaping prism and a diffraction grating as described previously referring to FIG. 3, from which three parallel shaped beams are outgoing. These three parallel beams are divergent at a fine angle θ determined by a focal length f of objective lens 27 and a spot distance d on the optical card 1. Here, the relation is d=f·tan θ.

The three parallel beams travel in an incident beam path approximately in parallel with the surface of optical card 1 and are reflected by a first reflecting surface of triangular prism 50 as reflecting means in the direction of the optical axis of objective lens 27, i.e., in the direction perpendicular to the optical card 1. These beams pass through the left half of objective lens 27 and then are reflected on the optical card 1. The reflected beams again pass through the right half of objective lens 27 and then are reflected by a second reflecting surface of prism 50. Then the beams travel straight in a reflected beam path approximately in parallel with the surface of optical card 1. The incident beam path and the reflected beam path are located on opposite sides with respect to the movable portion and on a straight line along the moving directions of the moving portion. It is preferred here that an apex of the prism 50 is located on the optical axis of objective lens 27, whereby the beam effective diameter can be fully utilized. Then the beams traveling in the reflected beam path are detected in the same manner as in the conventional technology by a detection optical system including a spherical lens, a cylindrical lens and a photodetector, and are processed in the same manner as in the conventional technology.

Arranging the optical system of an optical head as described above, the optical path length from the irradiation optical system to the detection optical system can be kept constant during movement of the movable portion in the directions of the arrows and can be almost a half of the maximum optical path length in the previously described conventional apparatus, which rarely causes the occurrence of optical axis deviation. This relaxes the acceptable range necessary for machining and assembling of components and facilitates a reduction in the cost of the device. Further, this arrangement provides a low possibility of the occurrence of beam eclipse and AT offset. Moreover, even if they occur, they are small and have a small change, which can be readily handled or corrected.

Figure 13:
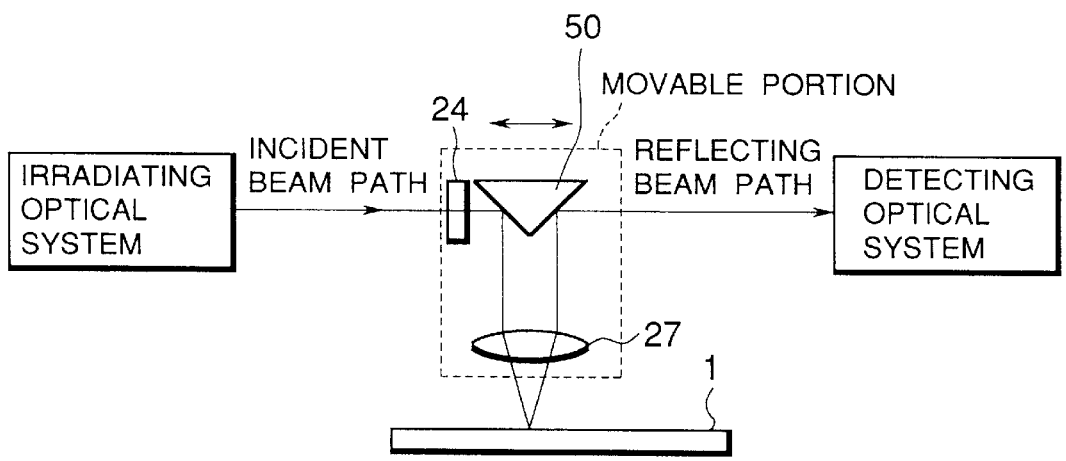
FIG. 13 is a schematic structural drawing to show an example of an optical head in an optical information recording and/or reproducing apparatus according to the present invention.

FIG. 13 is a schematic structural drawing to show an example of an optical head in an optical information recording and/or reproducing apparatus according to the present invention. In FIG. 13, members having the same functions as those in FIG. 12 are denoted by the same reference numerals.

In this example, the diffraction grating 24 is set in the movable portion. This arrangement can shorten the distance between the diffraction grating 24 and the objective lens 27 and can maintain the distance to be constant irrespective of the movement of the movable portion, which can further suppress the occurrence of optical axis deviation, the occurrence of AT offset and a change thereof, as compared with those in the example of FIG. 12. The other aspects of the structure thereof and the effects thereof are the same as those in the example of FIG. 12. The optical information recording and/or reproducing apparatus of the present invention as described above are so arranged that the optical system of the optical head is composed of the stationary portion having the irradiation optical system comprising the semiconductor laser 21 and the detection optical system comprising the photodetector 30, and the movable portion being movable relative to the stationary portion in the arrow directions and comprising the diffraction grating 24, the light reflecting triangular prism 50 and the objective lens 27, that a beam from the irradiation optical system is allowed to pass through the movable portion to form spots on the optical card 1, and that beams from the optical spots on the optical card 1 are allowed to pass through the movable portion to be guided into the detection optical system.

Figure 14:
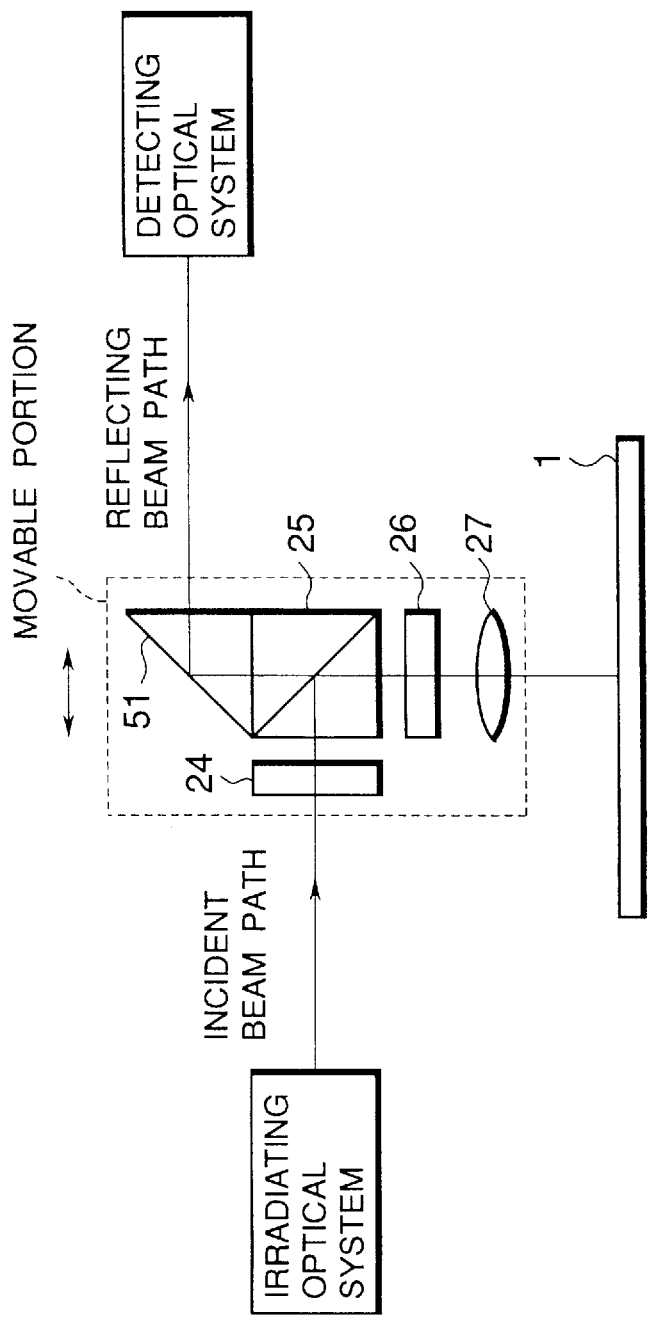
FIG. 14 is a schematic structural drawing to show an example of an optical head in an optical information recording and/or reproducing apparatus according to the present invention.

FIG. 14 is a schematic structural drawing to show an example of an optical head in an optical information recording and/or reproducing apparatus according to the present invention. In FIG. 14, members having the same functions as those in FIG. 13 are denoted by the same reference numerals.

In this example, the movable portion includes a polarization beam splitter 25, a quarter wave plate 26 and a total reflection prism 51. A laser beam traveling along an incident beam path approximately in parallel with the surface of optical card 1 is split into three beams by a diffraction grating 24 and the thus split beams enter the polarization beam splitter 25. These beams are incident as s-polarized beams into the polarization beam splitter 25, which reflects the s-polarized beams according to the characteristics in FIG. 4. After that, similar to the conventional apparatus, the beams travel via the quarter wave plate 26, the objective lens 27, the optical card 1, the objective lens 27 and the quarter wave plate 26, whereby the direction of polarization of the beams is rotated 90°. The beams are again incident as p-polarized beams into the polarization beam splitter 25, which transmits the beams according to the characteristics shown in FIG. 4. The beams are then reflected by the total reflection prism 51 to travel straight in the reflected beam path and then to reach the detection optical system. The reflected beam path is approximately parallel to the surface of optical card 1. The incident beam path and the reflected beam path are located on the opposite sides from each other with respect to the movable portion and extend in the directions of movement of the movable portion. This example can also enjoy the same advantages as the example of FIG. 13.

Figure 15:
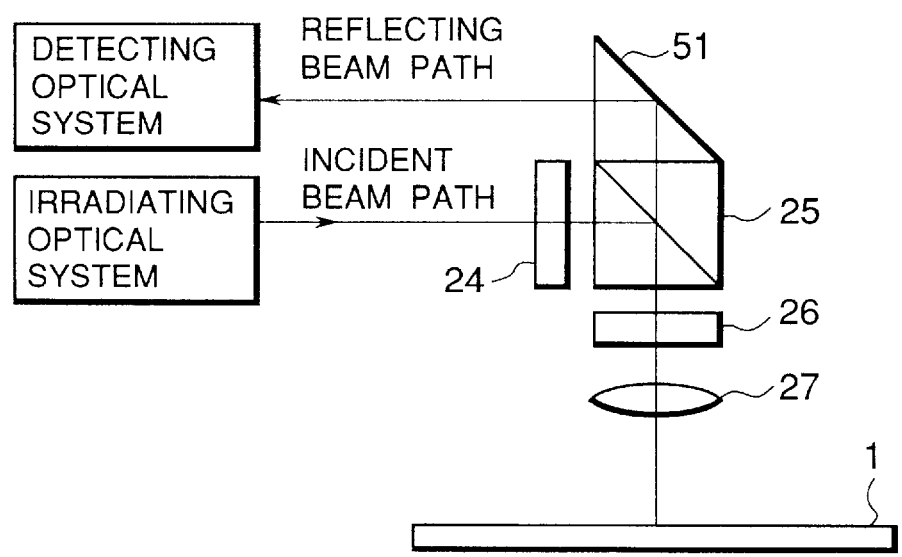
FIG. 15 is a schematic structural drawing to show an example of an optical head in an optical information recording and/or reproducing apparatus according to the present invention.

FIG. 15 is a schematic structural drawing to show an example of an optical head in an optical information recording and/or reproducing apparatus according to the present invention. In FIG. 15, members having the same functions as those in FIG. 14 are denoted by the same reference numerals.

In this example, a laser beam traveling in an incident beam path approximately in parallel with the surface of optical card 1 is split into three beams by the diffraction grating 24 and the thus split beams enter the polarization beam splitter 25. These beams are incident as s-polarized beams into the polarization beam splitter 25, which reflects the beams according to the characteristics in FIG. 4. Then, similar to the conventional apparatus, the beams travel via the quarter wave plate 26, the objective lens 27, the optical card 1, the objective lens 27 and the quarter wave plate 26, whereby the direction of polarization of the beams is rotated 90°. Then the beams are again incident as p-polarized beams into the polarization beam splitter 25, which transmits the beams according to the characteristics shown in FIG. 4. The beams are then reflected by the total reflection prism 51 to travel straight in a reflected beam path and then to reach the detection optical system. The reflected beam path is approximately parallel to the surface of optical card 1. In addition, the incident beam path and the reflected beam path are located on the same side with respect to the movable portion and are juxtaposed in parallel with each other. Further, the beams traveling in the reflected beam path are detected in a manner similar to the conventional apparatus by the detection optical system including the spherical lens, the cylindrical lens and the photodetector, and are processed in a manner similar to the conventional apparatus.

Arranging the optical system of optical head as described above, the irradiation optical system and the detection optical system can be located close to each other, which can reduce the size of the optical head and which can in turn reduce the size of the entire apparatus.

Figure 16A:
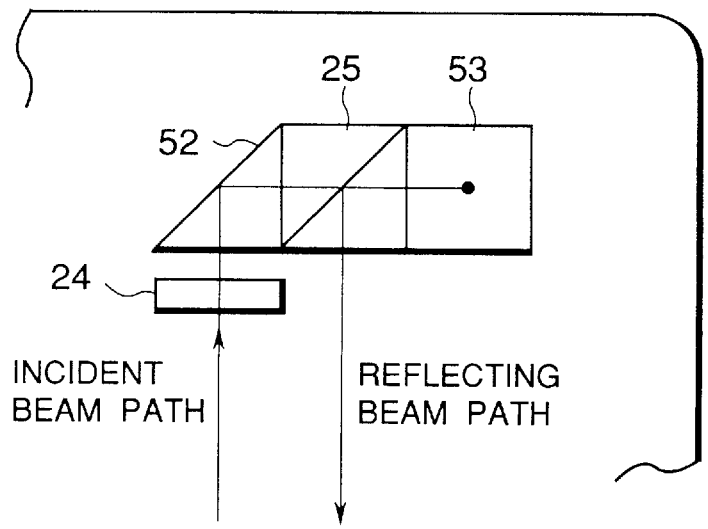
FIG. 16A and FIG. 16B are schematic structural drawings each to show an example of an optical head in an optical information recording and/or reproducing apparatus according to the present invention.
Figure 16B:
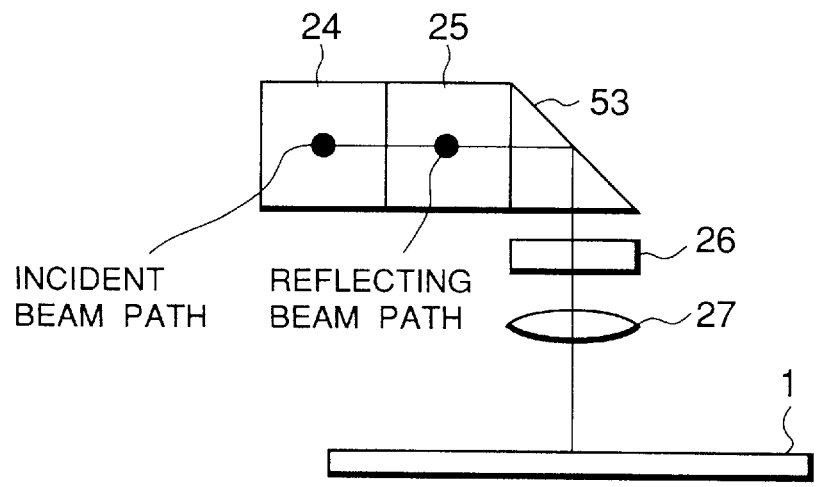

FIGS. 16A and 16B are schematic structural drawings to show an example of an optical head in an optical information recording and/or reproducing apparatus according to the present invention. FIG. 16A is a plan view and FIG. 16B a side view. In the drawings, members having the same functions as those in FIG. 15 are denoted by the same reference numerals.

In this example, using two total reflection prisms 52, 53, the incident beam path and the reflected beam path are juxtaposed at a same height. This example can also enjoy the same advantages as the example of FIG. 15.

Figure 17:
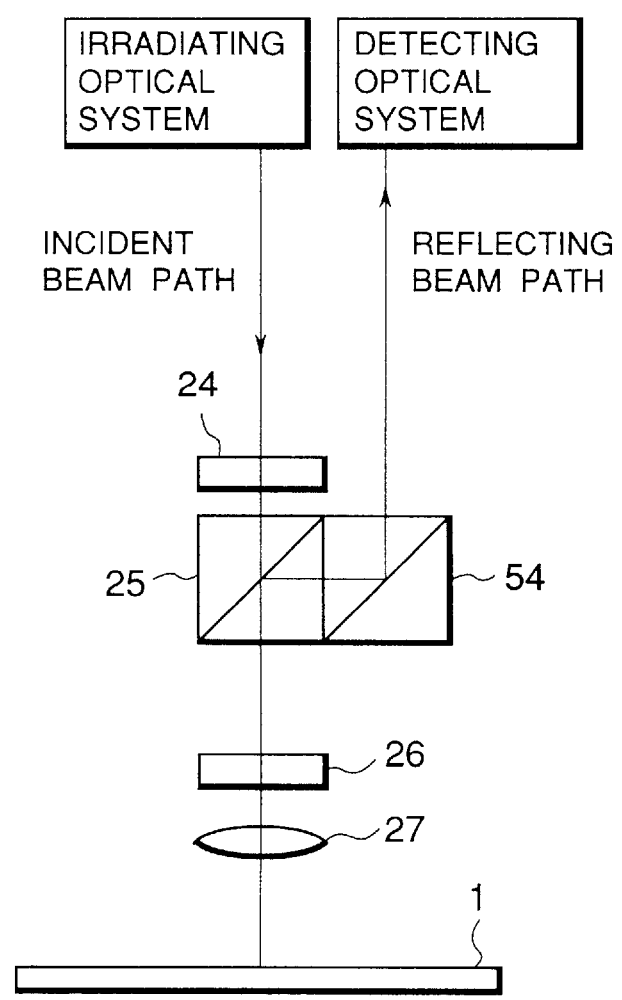
FIG. 17 is a schematic structural drawing to show an example of an optical head in an optical information recording and/or reproducing apparatus according to the present invention.

FIG. 17 is a schematic structural drawing to show an example of an optical head in an optical information recording and/or reproducing apparatus according to the present invention. In FIG. 17, members having the same functions as those in FIG. 15 are denoted by the same reference numerals.

In this example, using a reflection prism 54, the incident beam path and the reflected beam path are juxtaposed vertically. This example can also enjoy the same advantages as the example of FIG. 15.

Figure 18:
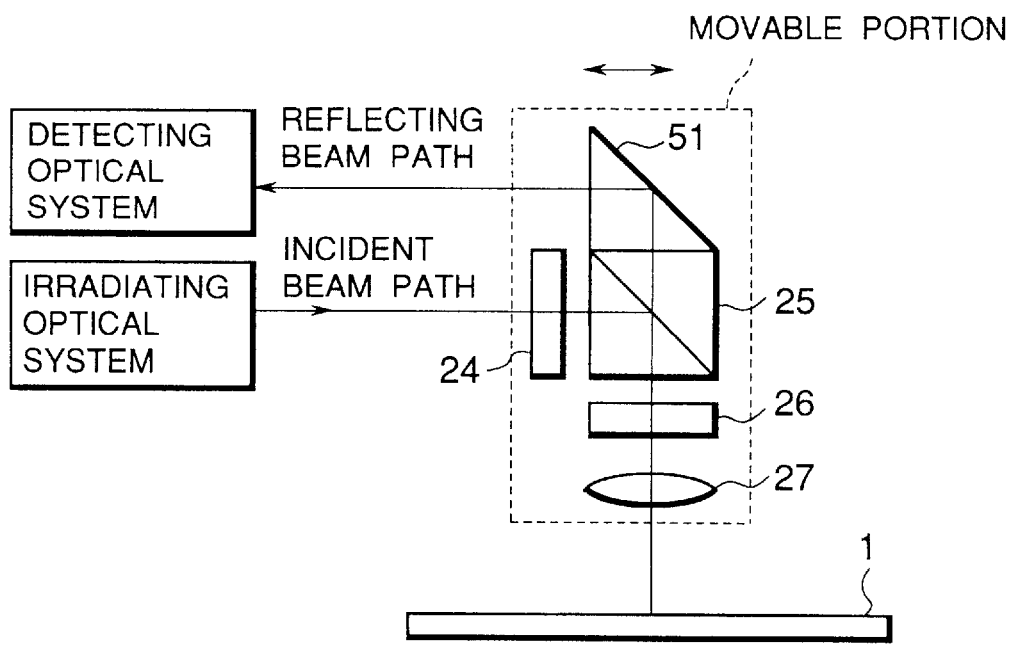
FIG. 18 is a schematic structural drawing to show an example of an optical head in an optical information recording and/or reproducing apparatus according to the present invention.

FIG. 18 is a schematic structural drawing to show an example of an optical head in an optical information recording and/or reproducing apparatus according to the present invention. In FIG. 18, members having the same functions as those in FIG. 14 are denoted by the same reference numerals.

In this example, the movable portion includes a polarization beam splitter 25, a quarter wave plate 26 and a total reflection prism 51. A laser beam traveling in an incident beam path approximately in parallel with the surface of optical card 1 is split into three beams by a diffraction grating 24, and the thus split beams enter the polarization beam splitter 25. These beams are incident as s-polarized beams into the polarization beam splitter 25, which reflects the beams according to the characteristics shown in FIG. 4. Then, similar to the conventional apparatus, the beams travel via the quarter wave plate 26, the objective lens 27, the optical card 1, the objective lens 27 and the quarter wave plate 26, whereby the direction of polarization of the beams is rotated 90°. The beams are again incident as p-polarized beams into the polarization beam splitter 25, which transmits the beams according to the characteristics shown in FIG. 4. The beams are then reflected by the total reflection prism 51 to travel straight in a reflected beam path and then to reach a detection optical system. The reflected beam path is approximately parallel to the surface of optical card 1. In addition, the incident beam path and the reflected beam path are located on the same side with respect to the movable portion and extend along the directions of movement of the movable portion. Then the beams traveling in the reflected beam path are detected similar to the conventional apparatus by the detection optical system including a spherical lens, a cylindrical lens and a photodetector, and are processed in a manner similar to the conventional apparatus.

Arranging the optical system of an optical head as described above, the distance between the diffraction grating 24 and the objective lens 27 can be shortened and the distance can be kept constant irrespective of the movement of the movable portion, which rarely causes beam eclipse and which can suppress the occurrence of AT offset and a change thereof.

Also, arranging the optical system of optical head as described above, the irradiation optical system and the detection optical system can be located close to each other, which can reduce the size of the optical head and which can in turn reduce the size of the entire apparatus.

In the examples of FIGS. 14 to 16A, 16B, 17 and 18, the optical elements except for the objective lens 27 in the movable portion may be bonded to each other to be incorporated with each other.

Further, if the diffraction grating as shown in FIGS. 11A and 11B is employed in one of the above embodiments including a diffraction grating, the advantages as described with respect to FIGS. 11A and 11B can be attained.

According to the present invention, as described above, setting the diffraction grating in the movable portion can shorten the distance between the diffraction grating and the objective lens and can maintain the distance constant irrespective of the movement of the movable portion, which can suppress the occurrence of optical axis deviation, the occurrence of AT offset and a change thereof. This can relax the acceptable range necessary for processing and assembling of components, which in turn facilitates a reduction in the cost of the device. Also, setting the diffraction grating in the movable portion can reduce a possibility of beam eclipse, whereby the diffraction angle by the diffraction grating can be increased. This can facilitate separation of three beams in the detection optical system, whereby excellent detection is possible even if the detection optical system has a shorter focal length. Accordingly, the detection optical system portion can be made smaller and the stationary portion in the optical system can be made smaller in turn.

Also, as described above, the present invention can provide an optical information recording and/or reproducing apparatus which requires moderate accuracy for prevention of optical axis deviation of the optical system, which has a wide acceptable range necessary for machining and assembling of components, and which can be easily reduced in cost.

Also, the present invention provides an optical information recording and/or reproducing apparatus providing a reduced occurrence of beam eclipse and AT offset, and which, even if they occur, can keep them so small and constant as to be readily handled.

Further, the present invention can reduce the size of the optical information recording and/or reproducing apparatus by the reduction of the size of the optical head.

What is claimed is:

1. An optical information recording and/or reproducing apparatus comprising:

a stationary portion having an irradiation optical system for generating a beam for recording information in an optical information recording medium and/or for reproducing recorded information from the recording medium, and a detection optical system for detecting a beam from the recording medium; and a movable portion being movable relative to said stationary portion and having beam splitting means for splitting the beam from said irradiation optical system into a plurality of beams, an objective lens for irradiating the beam from said irradiation optical system onto the recording medium, and optical path dividing means for guiding the beam from said irradiation optical system to the recording medium and for guiding the beam from the recording medium to said detection optical system, wherein the beam from said irradiation optical system is guided to said optical path dividing means by way of a first optical path, and the beam from said optical path dividing means is guided to said detection optical system by way of a second optical path different from the first optical path, and wherein said beam splitting means is disposed in the first optical path;

wherein said optical path dividing means includes a quarter wave plate disposed in an optical path between said beam splitting means and the recording medium.

2. An optical information recording and/or reproducing apparatus according to claim 1, wherein said beam splitting means is a diffraction grating.

3. An optical information recording and/or reproducing apparatus according to claim 1, wherein the first and second optical paths are positioned at the same side with respect to said movable portion.

4. An optical information recording and/or reproducing apparatus according to claim 1, wherein the first optical path is parallel to the second optical path.

5. An optical information recording and/or reproducing apparatus according to claim 4, wherein said first optical path and said second optical path are parallel to said recording medium.

6. An optical information recording and/or reproducing apparatus according to claim 4, wherein said first optical path and said second optical path are perpendicular to said recording medium.

7. An optical information recording and/or reproducing apparatus according to claim 4, wherein said optical path dividing means includes a polarizing beam splitter, a quarter wave plate and reflecting means.

8. An optical information recording and/or reproducing apparatus according to claim 7, wherein said beam splitting means, said polarization beam splitter, said quarter wave plate and said reflecting means are integrally joined.

* * * * *

UNITED STATES PATENT AND TRADEMARK OFFICE
CERTIFICATE OF CORRECTION

PATENT NO. : 5,771,219

DATED : June 23, 1998

INVENTOR : MORITOSHI MIYAMOTO

Page 1 of 2

It is certified that error appears in the above-identified patent and that said Letters Patent is hereby corrected as shown below:

<u>ON THE COVER PAGE, AT [63] RELATED U.S APPLICATION DATA</u>,
"Ser. No. 239,260," should read --Ser. No. 230,260,--.

<u>COLUMN 3</u>,
Line 10, "Positions" should read --The positions--.
Line 15, "let" should read --allowed--.

<u>COLUMN 7</u>,
Line 31, "information." should read --information therewith.--

<u>COLUMN 16</u>,
Line 39, "optical" should read --an optical--.

UNITED STATES PATENT AND TRADEMARK OFFICE
CERTIFICATE OF CORRECTION

PATENT NO. : 5,771,219

DATED : June 23, 1998

INVENTOR : MORITOSHI MIYAMOTO

It is certified that error appears in the above-identified patent and that said Letters Patent is hereby corrected as shown below:

<u>COLUMN 16 (CONT.)</u>,
Line 47, "a" should read --is a--.

<u>COLUMN 17</u>,
Line 40, "optical" should read --an optical--.

Signed and Sealed this

Nineteenth Day of October, 1999

Attest:

Q. TODD DICKINSON

*Attesting Officer*    *Acting Commissioner of Patents and Trademarks*